United States Patent
Hu

(10) Patent No.: US 7,699,944 B2
(45) Date of Patent: Apr. 20, 2010

(54) INTERMETALLIC BRAZE ALLOYS AND METHODS OF REPAIRING ENGINE COMPONENTS

(75) Inventor: Yiping Hu, Greer, SC (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/115,888

(22) Filed: May 6, 2008

(65) Prior Publication Data

US 2009/0280023 A1 Nov. 12, 2009

(51) Int. Cl.
*C22C 19/05* (2006.01)
(52) U.S. Cl. .................................. 148/428; 420/445
(58) Field of Classification Search .................. 148/427, 148/528; 420/6, 447, 448
See application file for complete search history.

(56) References Cited

U.S. PATENT DOCUMENTS

| | | | |
|---|---|---|---|
| 5,956,845 A | 9/1999 | Arnold | |
| 6,454,885 B1 | 9/2002 | Chesnes et al. | |
| 6,968,991 B2 | 11/2005 | Renteria et al. | |
| 7,277,268 B2 * | 10/2007 | Celik et al. | 361/305 |
| 2003/0136811 A1 | 7/2003 | Philip | |
| 2005/0139581 A1 | 6/2005 | Hu | |
| 2006/0134454 A1 | 6/2006 | Sathian | |
| 2006/0219329 A1 | 10/2006 | Hu et al. | |
| 2006/0219330 A1 | 10/2006 | Hu et al. | |
| 2006/0260125 A1 | 11/2006 | Arnold et al. | |
| 2007/0163684 A1 | 7/2007 | Hu | |

* cited by examiner

*Primary Examiner*—George Wyszomierski
(74) *Attorney, Agent, or Firm*—Ingrassia Fisher & Lorenz, P.C.

(57) ABSTRACT

Intermetallic braze alloys and methods of repairing an engine component are provided. In an embodiment, by way of example only, an intermetallic braze material includes between about 10% to about 15% chromium, by weight, between about 1% to about 3% aluminum, by weight, between about 0.1% to about 0.5% zirconium, by weight, between about 18% to about 25% hafnium, by weight, and a balance of nickel. In another embodiment, by way of example only, an intermetallic braze material includes between about 10% to about 15% chromium, by weight, between about 1% to about 3% aluminum, by weight, between about 10% to about 13% zirconium, by weight, between about 0.3% to about 0.7% hafnium, by weight, and a balance of nickel.

14 Claims, 1 Drawing Sheet

INTERMETALLIC BRAZE ALLOYS AND METHODS OF REPAIRING ENGINE COMPONENTS

TECHNICAL FIELD

The inventive subject matter generally relates to gas turbine engines, and more particularly relates to intermetallic braze alloys and methods for repairing engine components.

BACKGROUND

Turbine engines are used as the primary power source for various kinds of aircraft. The engines may also serve as auxiliary power sources that drive air compressors, hydraulic pumps, and industrial electrical power generators. Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge onto turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Other engines use this power to turn one or more propellers, electrical generators, or other devices.

Because fuel efficiency increases as engine operating temperatures increase, turbine engine blades and vanes are typically fabricated from high-temperature materials such as nickel-based superalloys. However, although nickel-based superalloys have good high-temperature properties and many other advantages, they may be susceptible to corrosion, oxidation, thermal fatigue, and/or foreign particle impact when exposed to harsh working environments during turbine engine operation. In such cases, the turbine engine blades and vanes may need to be repaired, such as by welding, by a diffusion brazing process or by a combination of both welding and diffusion brazing.

Diffusion brazing processes typically employ a braze alloy mixture that includes a base alloy material (also referred to as a "high-melt alloy") and a braze alloy material (also referred to as "a low-melt alloy"). The high-melt alloy is usually a material that is substantially similar in composition to the material of the component being repaired, while the low-melt alloy typically comprises an alloy powder including boron or silicon as melting-point depressants and a relatively small amount of (e.g., a volume fraction gamma prime of less than about 40) or no gamma prime elements or other solid solution strengthening alloying elements other than chromium. The low-melt alloy typically has a melting temperature that is lower than that of the high-melt alloy. After a slurry coating of the braze alloy mixture is applied to a damaged area on the turbine component and subjected to heat treatment in a vacuum furnace, the braze alloy mixture melts and heals cracks and builds up material loss on the damaged area.

Although the aforementioned processes are suitable for performing repairs on certain components, they may not be suitable for repairing other components, such as those made of single crystal superalloys. In particular, known conventional braze alloy mixtures may contain higher level of boron or silicon. These melting-point depressants may be limited to repairing components that may be exposed to turbine inlet temperatures up to about 1450° C. because the resultant braze repaired areas may not retain desirable properties at higher operating temperatures. In addition, due to addition of high level of boron and/or silicon, brittle centerline borides may form in braze joints or surface areas which may decrease the ductility thereof.

Accordingly, an improved braze alloy mixture suitable for repairing cracks in a components intended for exposure to turbine inlet temperatures higher than 1450° C. is desired. In particular, it is desirable to have a braze alloy mixture and a method for repairing a component that does not cause the formation of brittle phases in the repaired areas. In addition, it is desirable for the method to be relatively simple and inexpensive to implement. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Intermetallic braze alloys and methods of repairing an engine component are provided.

In an embodiment, by way of example only, an intermetallic braze material includes between about 10% to about 15% chromium, by weight, between about 1% to about 3% aluminum, by weight, between about 0.1% to about 0.5% zirconium, by weight, between about 18% to about 25% hafnium, by weight, and a balance of nickel.

In another embodiment, by way of example only, an intermetallic braze material includes between about 10% to about 15% chromium, by weight, between about 1% to about 3% aluminum, by weight, between about 10% to about 13% zirconium, by weight, between about 0.3% to about 0.7% hafnium, by weight, and a balance of nickel.

In yet another embodiment, by way of example only, a method includes repairing an engine component by forming at least one layer of a braze alloy mixture over a structural feature of the component, the braze alloy mixture comprising a base alloy material, and an intermetallic braze alloy material comprising a material selected from a group consisting of a first composition and a second composition, wherein, the first composition comprises between about 10% to about 15% chromium, by weight, between about 1% to about 3% aluminum, by weight, between about 0.1% to about 0.5% zirconium, by weight, between about 18% to about 25% hafnium, by weight, and a balance of nickel, and the second composition comprises between about 10% to about 15% chromium, by weight, between about 1% to about 3% aluminum, by weight, between about 10% to about 13% zirconium, by weight, between about 0.3% to about 0.7% hafnium, by weight, and a balance of nickel, and subjecting the component to a heat treatment to melt the braze alloy mixture and to flow at least a portion of the braze alloy mixture into the structural feature.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
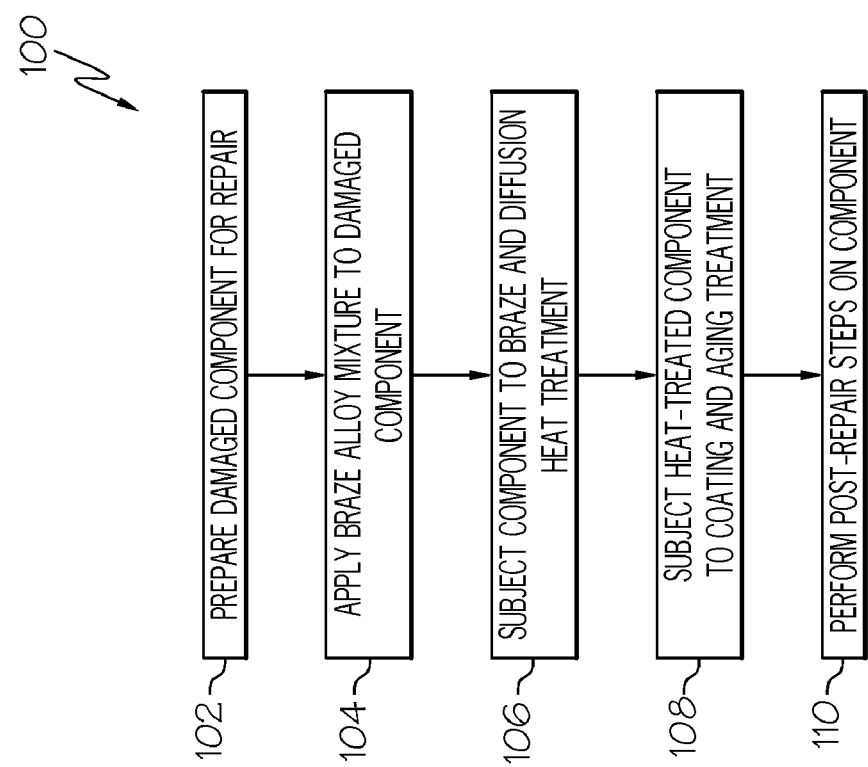
FIG. 1 is a flow diagram of a method of repairing an engine component, according to an embodiment.

Turning now to FIG. 1, a flow diagram of a method 100 of repairing an engine component is provided, according to an embodiment. The method 100 may be used to repair a variety of different turbine engine components, such as high pressure turbine (HPT) components including turbine vanes, nozzle guide vanes, other stationary vanes, turbine shrouds, or other components in a "hot" section of a turbine engine (e.g., in a section in which components are exposed to turbine inlet temperatures in excess of 1450° C.) and are thus particularly susceptible to wear, oxidation erosion, and other degradation.

Figure 2:
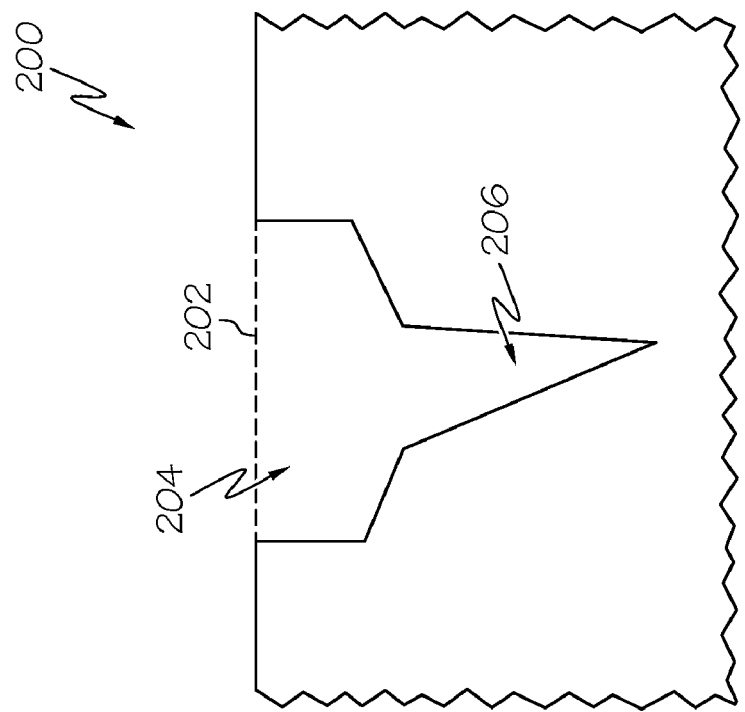
FIG. 2 is a simplified cross-sectional view of a portion of a component having a structural feature, according to an embodiment.

The method 100 may be particularly useful in healing cracks or repairing other types of structural features and restoring both a geometry and dimension of the component to an original geometry and dimension. As used herein, the term "structural feature" means a physical feature of a component having a smooth or irregular-shaped surface contour that extends below an original or intended surface contour of the component. A structural feature may include a crack, a machined indentation, a divot, a hole or any other structural feature, and a structural feature may be a feature that was made intentionally or due to a projectile impact, corrosion, oxidation, thermal fatigue, and/or other types of wear experienced by the component. For example, FIG. 2 is a cross-sectional view of a portion of a component 200 having a structural feature. An original or intended surface contour 202 of the component 200 is shown in phantom. As depicted in FIG. 2, the structural feature of the component 200 includes a worn section 204 and a crack 206. The worn section 204 may be a removed portion of the component 200 and may have any dimensions. For example, the worn section 204 may have a depth of anywhere from 0.1 mm to 1.0 mm or in some cases the worn section 204 may be deeper or shallower. The crack 206 may have a depth of between about 0.1 mm and about 1.0 mm or, in some cases, the crack 206 may be deeper or shallower. The crack 206 may also have a width of between about 0.1 mm and about 1.0 mm. In other cases, the crack 206 may be wider or narrower.

In any case, returning to FIG. 1, when it is desired to repair the structural feature, the component may first be prepared for repair, step 102. In an embodiment, step 102 may include chemically preparing the surface of the component at least in proximity to and/or on surfaces defining the structural feature. For example, in an embodiment in which the component includes an outer environment-protection coating, the coating may be removed. Thus, a chemical stripping solution may be applied to a surface of the component, such as the surfaces and portions of the component surrounding and/or defining the structural feature. Suitable chemicals used to strip the coating may include, for example, nitric acid solution. However, other chemicals may alternatively be used, depending on a particular composition of the coating. In another embodiment, the component may be mechanically prepared. Examples of mechanical preparation include, for example, pre-repair machining and/or degreasing surfaces in proximity to and/or defining the structural feature in order to remove any oxidation, dirt or other contaminants. In another embodiment, surface preparation may occur and may include a fluoride ion cleaning process to remove oxides from the surfaces of the component. The fluoride ion cleaning process may be followed with a high-temperature vacuum cleaning process to remove excess fluoride remainder that may be on the component. In other embodiments, additional or different types and numbers of preparatory steps can be performed.

Next, a braze alloy mixture may be applied to surfaces of the component in proximity to and/or defining the structural feature, step 104. In an embodiment, the braze alloy mixture includes a base alloy material and an intermetallic braze alloy material, and in some embodiments, a binder. The base alloy material, also known as a "high-melt alloy", may be a material that is substantially similar in composition to a material from which the component is made, in an embodiment. In another embodiment, the base alloy material may be a material that has improved corrosion-resistance, oxidation-resistance, or other desired properties over the material of the component. Suitable base alloy materials include, but are not limited to IN738LC, C101, MarM247, INC713C, Rene 80, IN792, HON4, SC180 and the like. The acceptable concentrations of the elements that comprise the previously mentioned base alloy materials are presented in Table 1 by weight percent. In all of the various base alloy materials, the balance of the concentration is preferably nickel, though the balance could be nickel and one or more other elements that may be present in trace amounts.

TABLE 1

| Alloy | Co | Cr | Mo | W | Ta | Al | Ti | C | B | Nb | Zr | other |
|---|---|---|---|---|---|---|---|---|---|---|---|---|
| IN738LC | 8.5 | 16.0 | 1.75 | 2.6 | 1.75 | 3.4 | 3.4 | .11 | .01 | .9 | .05 | — |
| C101 | 9.0 | 12.6 | 1.9 | 4.17 | 4.17 | 3.4 | 4.0 | .13 | .015 | .10 | .03 | .9Hf |
| Mar-M247 | 10.0 | 8.25 | .7 | 10.0 | 3.0 | 5.5 | 1.0 | .15 | .015 | — | .05 | 1.5Hf |
| IN713C | — | 12.5 | 4.2 | — | 1.75 | 6.0 | .80 | .12 | .012 | .90 | .10 | — |
| Rene 80 | 9.5 | 14.0 | 4.0 | 4.0 | — | 3.0 | 5.0 | .17 | .015 | — | .02 | — |
| IN792 | 9.0 | 12.4 | 1.9 | 3.8 | 3.9 | 3.1 | 4.5 | .12 | .02 | — | .10 | 1.1Hf |
| HON-4 | 9.6 | 6.8 | 1.5 | 4.0 | 6.0 | 6.2 | — | 0.10 | 0.01 | — | 0.02 | 2.6Re 0.01Y |
| SC-180 | 10.0 | 5.2 | 1.7 | 5.0 | 8.5 | 5.2 | 1.0 | — | — | — | — | 3.0Re 0.1Hf |

The intermetallic braze alloy material, also referred to as a "low-melt alloy" has a melting temperature that is lower than that of the base alloy material or "high-melt alloy," and is formulated to include intermetallic, gamma prime and solid solution strengthening alloying elements and a melting-point depressant. In an embodiment, the intermetallic braze alloy material is a nickel-based alloy broadly defined as comprising nickel, chromium, aluminum, hafnium, and zirconium, wherein hafnium or zirconium serves as a melting-point depressant. In another embodiment, tungsten, tantalum, or both may be included.

In an example in which hafnium is a melting-point depressant, the intermetallic braze alloy material may include by weight, chromium in a range of between about 10% to about 15%, aluminum in a range of between about 1% to about 3%, zirconium in a range of between about 0.1% to about 0.5%, hafnium in a range of between about 18% to about 25%, and a balance of nickel. The aforementioned intermetallic braze alloy material may further include tungsten and/or tantalum. For example, tungsten may be included in a range of between about 1% and about 5%, by weight. In another example, tantalum may be included in a range of between about 1% and about 5%, by weight. In still another example, tungsten may be included in a range of between about 1% and about 5%, by weight, and tantalum may be included in a range of between about 1% and about 5%, by weight. One particular embodiment of the intermetallic braze alloy material includes about 13% by weight of chromium, about 2% by weight of aluminum, about 0.3% by weight of zirconium, about 18% by weight of hafnium, and a balance of nickel. The aforementioned intermetallic braze alloy material additionally may include about 3% tungsten, in an embodiment, or about 3% tantalum, in another embodiment, or both in still another embodiment. Another particular embodiment of the intermetallic braze alloy material includes about 13% by weight of chromium, about 2% by weight of aluminum, about 0.3% by weight of zirconium, about 25% by weight of hafnium, and a balance of nickel. The aforementioned intermetallic braze alloy material additionally may include about 3% tungsten, in an embodiment, or about 3% tantalum, in another embodiment, or both in still another embodiment In an example in which zirconium is a melting-point depressant, the intermetallic braze alloy material may include by weight, chromium in a range of about 10% to about 15%, aluminum in a range of between about 1% to about 3%, zirconium in a range of between about 10% to about 13%, hafnium in a range of between about 0.3% to about 0.7%, and a balance of nickel. The aforementioned intermetallic braze alloy material may further include tungsten and/or tantalum. In an example, tungsten may be included in a range of between about 1% and about 5%, by weight. In another example, tantalum may be included in a range of between about 1% and about 5%, by weight. In still another example, tungsten may be included in a range of between about 1% and about 5%, by weight, and tantalum may be included in a range of between about 1% and about 5%, by weight. In one particular embodiment of the intermetallic braze alloy material, about 13% by weight of chromium, about 2% by weight of aluminum, about 11% by weight of zirconium, about 0.5% by weight of hafnium, and a balance of nickel may be included. The aforementioned intermetallic braze alloy material additionally may include about 3% tungsten, in an embodiment, or about 3% tantalum, in another embodiment, or both in still another embodiment.

In an embodiment, the base alloy material and the intermetallic braze alloy material may be both powders. The base alloy material and the intermetallic braze alloy powders may be mixed at a predetermined ratio to form the braze alloy mixture. For example, the predetermine ratio between the base alloy material and the intermetallic braze alloy may be between 60:40 to 40:60, according to an embodiment. In another embodiment, the ratio may be 50:50. The particular ratio may depend on specific application conditions. In one example, the braze alloy mixture may also include a binder. The binder may include a suspension medium that is incorporated to hold the base alloy material powder and the intermetallic braze alloy material powder together and to allow the mixture slurry to adhere to and diffuse into the surface of the component. For example, the binder may include toluene and acetone. A suitable binder may include, for example, AB215 (available through HiTec Metal Group, Inc. of Cincinnati, Ohio). The amount of binder included in the braze alloy mixture depends on a desired consistency thereof. For example, in instances in which the braze material is formed into a paste or a slurry, the powders may make up between about 85% to about 90% of the braze alloy mixture and the binder may make up between about 10% to about 15% of the braze alloy mixture. In other embodiments, the braze material may include the powders and the binder at ratios different from those previously mentioned.

The braze alloy mixture is then used to form one or more layers over surfaces in proximity to and/or defining the structural feature. In this regard, at least one layer of the braze alloy mixture is applied to the surfaces to at least cover or partially fill in the structural feature. For example, in some cases, the braze alloy mixture is applied to cover one or more surfaces defining a crack. In an embodiment, one or more layers (e.g., in a range of 1-3 layers) are applied to the surfaces. In other embodiments, more than three layers may be applied. The braze alloy mixture may be applied using any one of numerous methods suitable for creating a layer on the component. In an embodiment, the braze alloy mixture may be painted onto the component surfaces using a brush. In another embodiment, a syringe may be used for siphoning the braze alloy mixture and depositing the braze alloy mixture in various desired areas of the component. In still another embodiment, the braze alloy mixture may be pushed into or used to fill the various areas of the component using a spatula. Each applied layer may have a thickness of between about 0.05 mm and about 0.13 mm, and a total thickness of the applied braze alloy mixture may be between about 0.25 mm and about 0.40 mm. In other embodiments, the layers and the thickness of each of the layers and/or the total thickness of the applied braze alloy mixture may be greater or less. In an embodiment, each layer of the braze alloy mixture may be dried or allowed to cure before a subsequent layer is applied thereover.

The component, including the braze alloy mixture thereon, is subjected to a heat treatment process, step 106. In an embodiment, the heat treatment process may occur in a vacuum furnace. For example, in an embodiment, the component is placed in a vacuum furnace and exposed to a temperature that is sufficiently high to melt the braze alloy mixture, to at least draw a portion of the braze alloy mixture into the crack or other structural feature via capillary action. In an example, the heat treatment may include the steps of heating the component to a first temperature of between about 1232° C. and 1290° C. and maintaining the first temperature for between about 15 to 45 minutes, and subsequently decreasing the temperature of the component to a second temperature that is below a solidus temperature of the intermetallic braze alloy material, for example between about 1175° C. and 1180° C., and maintaining the second temperature for between about four to twenty hours. In an embodiment, the temperature may be incrementally increased at a rate of between about 10 and about 16° C./min, while the step of decreasing the temperature may be performed at a rate that is less, such as between about 15 to about 55° C./min.

In an embodiment, the heat treatment process may be performed on a localized portion of the component using a laser. In an example, after the braze alloy mixture is applied at least to the structural feature, it is then subjected to a temperature suitable to substantially decompose and evaporate the binder in the braze alloy mixture. The phrase "substantially decompose" may be defined as altering a microstructure of the binder of the braze alloy mixture such that substantially all of the binder burns off. In an embodiment, the component is heat-treated using a predetermined temperature for a predetermined duration of time. For example, the component may be disposed in a vacuum furnace and subjected to the predetermined temperature for the predetermined duration of time. In another embodiment, the heat treatment may be localized to the structural feature. For instance, a heating apparatus, such as a laser welding system or hand-held laser, may be used to heat the portion of the component including the structural feature. The predetermined temperature may be a temperature that is below a melting temperature of the braze alloy mixture (e.g. more than 600° C. below) and at or above a temperature at which the binder in the braze alloy mixture will decompose or burn off. In particular, the predetermined temperature is below a temperature at which the microstructure of the component could not be altered. In an embodiment, the predetermined temperature may be less than half the melting temperature of the braze alloy mixture. In one example, the intermetallic braze alloy material may have a melting temperature about 1200° C. and the predetermined temperature may be between about 500° C. and 550° C., and preferably about 538° C. The predetermined duration of time may be a duration that allows the binder to decompose and evaporate. In an embodiment, the predetermined duration of time in vacuum furnace may be about 1 hour. It will be appreciated that the lower the temperature, the more time may be employed, and vice versa.

The braze alloy mixture is then heated using laser energy to a second temperature that is substantially equal to or above the melting temperature of the braze alloy mixture to form the brazed joint on the component. The braze alloy mixture may be directly heated or indirectly heated with laser energy. The laser energy may be provided by a hand-held laser welding system. In an embodiment, the portion of the component including the structural feature and braze alloy mixture are subjected to a laser-welding process in which the laser energy heats the braze alloy mixture to a temperature substantially equal to or above that of the base alloy material therein. In another embodiment, the portion of the component including the structural feature and braze alloy mixture may be subjected to a laser-brazing process. In the laser-brazing process, the portion of the component including the structural feature and braze alloy mixture are heated to the brazing temperature with a laser, and the heat is conducted through the component and to the braze alloy mixture. Thus, the braze alloy mixture melts without being directly heated by the laser. To prevent contaminants from being included in the resulting brazed joint, this step may occur in a protective atmosphere. For example, the protective atmosphere may be provided in a purge box that includes an inert gas, such as argon, disposed therein.

The diffusion braze heat-treated component may then be subjected to a coating and aging treatment, step 108. In an embodiment, the aging treatment includes subjecting the braze heat-treated component to a temperature of between about 1075° C. and 1085° C. and maintaining the temperature for about four hours, and then decreasing the temperature of the component to between about 895° C. and 905° C. and maintaining the temperature for about four hours. In other embodiments, other coating and aging thermal treatment cycles may alternatively be employed, where different temperatures and time durations outside of the aforementioned ranges may be employed. Moreover, the number of steps in other aging treatment cycles may vary as well.

Post-repair steps may be performed on the component, step 1110. For example, post-repair steps may include processes that improve the component's mechanical properties, and metallurgical integrity. For example, the component may be machined to its originally designed dimension. Additionally, or alternatively, the component may undergo at least one inspection process to determine whether any surface defects, such as cracks, other openings, and/or other structural features exist. An inspection process can be conducted using any well-known non-destructive inspection techniques including, but not limited to, a fluorescent penetration inspection ("FPI inspection"), and a radiographic inspection. If the component passes inspection, it may undergo a re-coating process. In an embodiment, the re-coating process may use environment-resistant diffusion aluminide and/or MCrAlY overlay coatings, followed by coating diffusion, and aging heat treatments to homogenize microstructures in the overlay coatings and to improve coating performance. In another embodiment, the component may be coated with a thermal barrier coating by electron beam physical vapor deposition. Then, a final inspection may be performed on the component. If the repaired component passes the final inspection, it may be ready for use.

Improved braze alloys and methods of repairing engine components using the materials have now been provided. The intermetallic braze alloy materials may be more ductile and may have improved high-temperature properties, and thus, may be more suitable for repairing components that may be exposed to turbine inlet temperatures in excess of 1450° C., as compared to conventional braze alloy materials. Moreover, the intermetallic braze alloy materials may be used in place of conventional braze alloy materials without including additional, complicated steps in the repair methods.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A low-melt alloy material for use in a braze mixture, the low-melt alloy material comprising:
   between about 10% to about 15% chromium, by weight;
   between about 1% to about 3% aluminum, by weight;
   between about 0.1% to about 0.5% zirconium, by weight;
   between about 18% to about 25% hafnium, by weight; and
   a balance of nickel.

2. The low-melt alloy material of claim 1, further comprising:
   between about 1% and about 5% tungsten, by weight.

3. The low-melt alloy material of claim 1, further comprising:
   between about 1% and about 5% tantalum, by weight.

4. The low-melt alloy material of claim 1, further comprising:
   between about 1% and about 5% tungsten, by weight; and
   between about 1% and about 5% tantalum, by weight.

5. The low-melt alloy material of claim 1, comprising:
   about 13% chromium, by weight;
   about 2% aluminum, by weight;

about 0.3% zirconium, by weight; and
about 18% hafnium, by weight.

6. The low-melt alloy material of claim 5, further comprising:
about 3% tungsten, by weight.

7. The low-melt alloy material of claim 5, further comprising:
about 3% tantalum, by weight.

8. The low-melt alloy material of claim 1, comprising:
about 13% chromium, by weight;
about 2% aluminum, by weight;
about 0.3% zirconium, by weight; and
about 25% hafnium, by weight.

9. The low-melt alloy material of claim 8, further comprising:
about 3% tungsten, by weight.

10. The low-melt alloy material of claim 8, further comprising:
about 3% tantalum, by weight.

11. An intermetallic braze alloy material, comprising:
about 13% chromium, by weight;
about 2% aluminum, by weight;
about 0.3% zirconium, by weight;
about 25% hafnium, by weight; and
a balance of nickel.

12. The intermetallic braze alloy material of claim 11, further comprising:
about 3% tungsten, by weight.

13. The intermetallic braze alloy material of claim 11, further comprising:
about 3% tantalum, by weight.

14. An intermetallic braze alloy material, comprising:
between about 1% to about 15% chromium, by weight;
between about 1% to about 3% aluminum, by weight;
between about 0.1% to about 0.5% zirconium, by weight;
about 25% hafnium, by weight; and
a balance of nickel.

* * * * *

UNITED STATES PATENT AND TRADEMARK OFFICE
CERTIFICATE OF CORRECTION

PATENT NO. : 7,699,944 B2  Page 1 of 1
APPLICATION NO. : 12/115888
DATED : April 20, 2010
INVENTOR(S) : Yiping Hu It is certified that error appears in the above-identified patent and that said Letters Patent is hereby corrected as shown below:

Column 8, line 52, "hafhnium" should be changed to --hafnium--.

Signed and Sealed this

Twenty-ninth Day of June, 2010

David J. Kappos
*Director of the United States Patent and Trademark Office*